(12) United States Patent
Kole et al.

(10) Patent No.: US 9,146,588 B2
(45) Date of Patent: Sep. 29, 2015

(54) SYSTEMS AND METHODS FOR SECURING COMPONENTS OF AN ELECTRONIC DEVICE

(71) Applicant: Apple Inc., Cupertino, CA (US)

(72) Inventors: Jared M. Kole, San Jose, CA (US); Michael Benjamin Wittenberg, Sunnyvale, CA (US); Shayan Malek, San Jose, CA (US)

(73) Assignee: Apple Inc., Cupertino, CA (US)

( * ) Notice: Subject to any disclaimer, the term of this patent is extended or adjusted under 35 U.S.C. 154(b) by 292 days.

(21) Appl. No.: 13/632,096

(22) Filed: Sep. 30, 2012

(65) Prior Publication Data

US 2014/0092532 A1    Apr. 3, 2014

(51) Int. Cl.
   *G06F 1/16*     (2006.01)
   *H04M 1/02*     (2006.01)

(52) U.S. Cl.
   CPC ............ *G06F 1/1637* (2013.01); *G06F 1/1626* (2013.01); *H04M 1/0249* (2013.01); *Y10T 29/49826* (2015.01)

(58) Field of Classification Search
   USPC ....................... 361/679.55, 679.56; 455/575.1
   See application file for complete search history.

(56) References Cited

U.S. PATENT DOCUMENTS

| 3,505,921 | A | * | 4/1970 | Wigam | 411/34 |
|---|---|---|---|---|---|
| 4,208,944 | A | * | 6/1980 | Moryl | 411/34 |
| 5,307,238 | A | * | 4/1994 | Marcus | 348/837 |
| 5,613,237 | A | * | 3/1997 | Bent et al. | 455/351 |
| 6,229,695 | B1 | * | 5/2001 | Moon | 361/679.3 |
| 6,315,142 | B1 | * | 11/2001 | Kitamura et al. | 220/4.02 |
| 6,893,196 | B2 | * | 5/2005 | Wille | 411/34 |
| 6,894,739 | B2 | * | 5/2005 | Sung et al. | 349/58 |
| 7,014,227 | B2 | * | 3/2006 | Strangward et al. | 292/160 |
| 7,072,624 | B2 | * | 7/2006 | Zheng et al. | 455/90.3 |
| 7,209,195 | B2 | * | 4/2007 | Lin | 349/58 |
| 7,429,700 | B2 | * | 9/2008 | Kanamaru et al. | 174/50 |
| 7,501,573 | B2 | * | 3/2009 | Balfour, Jr. | 174/37 |
| 7,524,198 | B2 | * | 4/2009 | Nguyen et al. | 439/131 |
| 7,679,889 | B2 | * | 3/2010 | Sakata | 361/679.01 |
| 7,697,269 | B2 | * | 4/2010 | Yang et al. | 361/679.01 |
| 7,712,621 | B2 | * | 5/2010 | Cho et al. | 220/4.28 |
| 7,796,381 | B2 | | 9/2010 | Zuo et al. | |
| 7,813,112 | B2 | * | 10/2010 | Ge et al. | 361/679.01 |
| 7,824,792 | B2 | | 11/2010 | Shi | |
| 7,903,399 | B2 | * | 3/2011 | Kim et al. | 361/679.21 |
| 7,940,287 | B2 | * | 5/2011 | Kim et al. | 349/60 |
| 8,101,859 | B2 | * | 1/2012 | Zadesky | 174/50 |
| 8,148,633 | B2 | * | 4/2012 | Hung | 174/50 |
| 8,289,689 | B2 | * | 10/2012 | Chen et al. | 361/679.3 |
| 8,297,666 | B2 | | 10/2012 | Rajagopal et al. | |
| 8,342,325 | B2 | * | 1/2013 | Rayner | 206/320 |
| 8,345,422 | B2 | | 1/2013 | Chen et al. | |
| 8,405,979 | B2 | * | 3/2013 | Chen et al. | 361/679.58 |
| 8,422,220 | B2 | * | 4/2013 | Chen | 361/679.58 |
| 8,434,798 | B2 | * | 5/2013 | Hsiung | 292/251 |
| 8,434,984 | B2 | * | 5/2013 | Toosky | 411/361 |
| 8,480,186 | B2 | * | 7/2013 | Wang | 312/223.1 |

(Continued)

*Primary Examiner* — Adrian S Wilson
(74) *Attorney, Agent, or Firm* — Downey Brand LLP

(57) ABSTRACT

Systems and methods for securing components of an electronic device are provided. In some embodiments, the electronic device may include a housing having an opening, a cover resting on a portion of the electronic device in a first cover position within the opening, and a lock component configured to move within the housing from a first lock position to a second lock position for securing the cover in the first cover position.

20 Claims, 13 Drawing Sheets

(56) References Cited

U.S. PATENT DOCUMENTS

| | | |
|---|---|---|
| 8,670,226 B2* | 3/2014 | Lee .................... 361/679.21 |
| 8,716,598 B2* | 5/2014 | Pan ........................ 174/50 |
| 2004/0127270 A1* | 7/2004 | Wulff et al. ............ 455/575.4 |
| 2004/0203518 A1* | 10/2004 | Zheng et al. ............ 455/90.3 |
| 2006/0139856 A1* | 6/2006 | Liu et al. ................ 361/600 |
| 2006/0146486 A1* | 7/2006 | Wikstrom et al. ........ 361/681 |
| 2007/0003827 A1* | 1/2007 | Zuo et al. ................. 429/97 |
| 2007/0026297 A1 | 2/2007 | Qin et al. |
| 2008/0081679 A1* | 4/2008 | Kawasaki et al. ........ 455/575.8 |
| 2009/0111543 A1* | 4/2009 | Tai et al. ............... 455/575.8 |
| 2009/0160199 A1* | 6/2009 | Ramsauer .................. 292/256 |
| 2009/0168337 A1* | 7/2009 | Conti et al. ............ 361/679.56 |
| 2009/0175020 A1* | 7/2009 | Zadesky ................... 361/818 |
| 2010/0061040 A1* | 3/2010 | Dabov et al. ........... 361/679.01 |
| 2010/0061044 A1* | 3/2010 | Zou et al. ............. 361/679.01 |
| 2010/0130268 A1* | 5/2010 | Huang et al. ............ 455/575.1 |
| 2010/0320883 A1* | 12/2010 | Yang et al. .............. 312/223.1 |
| 2011/0050054 A1* | 3/2011 | Chang et al. ............ 312/223.1 |
| 2011/0209376 A1* | 9/2011 | Kinno ..................... 40/790 |
| 2011/0273823 A1* | 11/2011 | Lamers et al. ........ 361/679.01 |
| 2012/0055826 A1* | 3/2012 | Nishimura ................ 206/320 |
| 2013/0027862 A1* | 1/2013 | Rayner .................. 361/679.3 |

\* cited by examiner

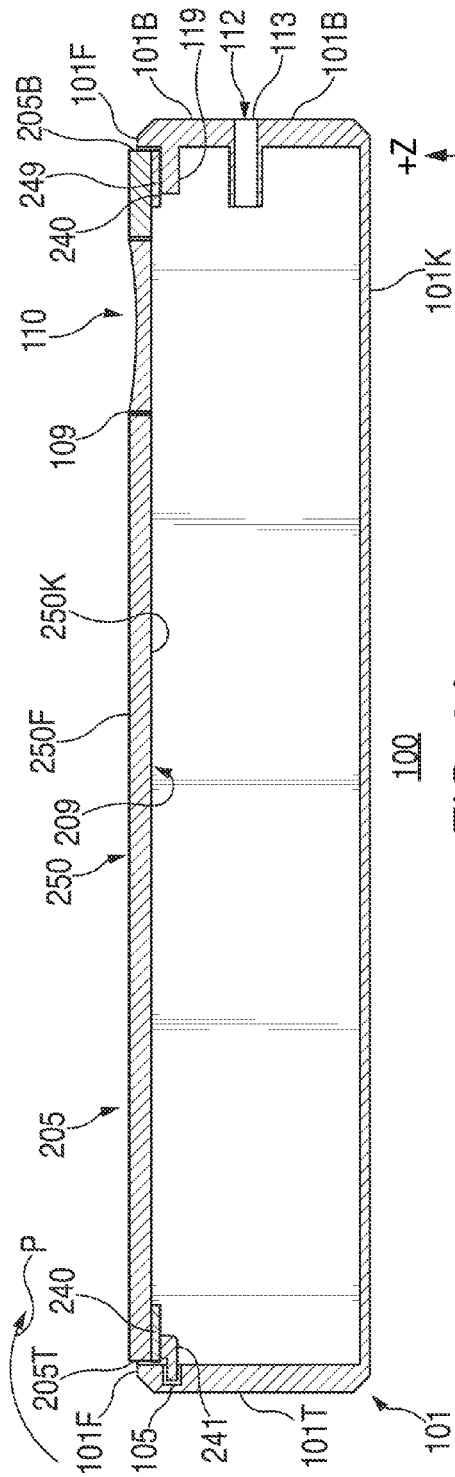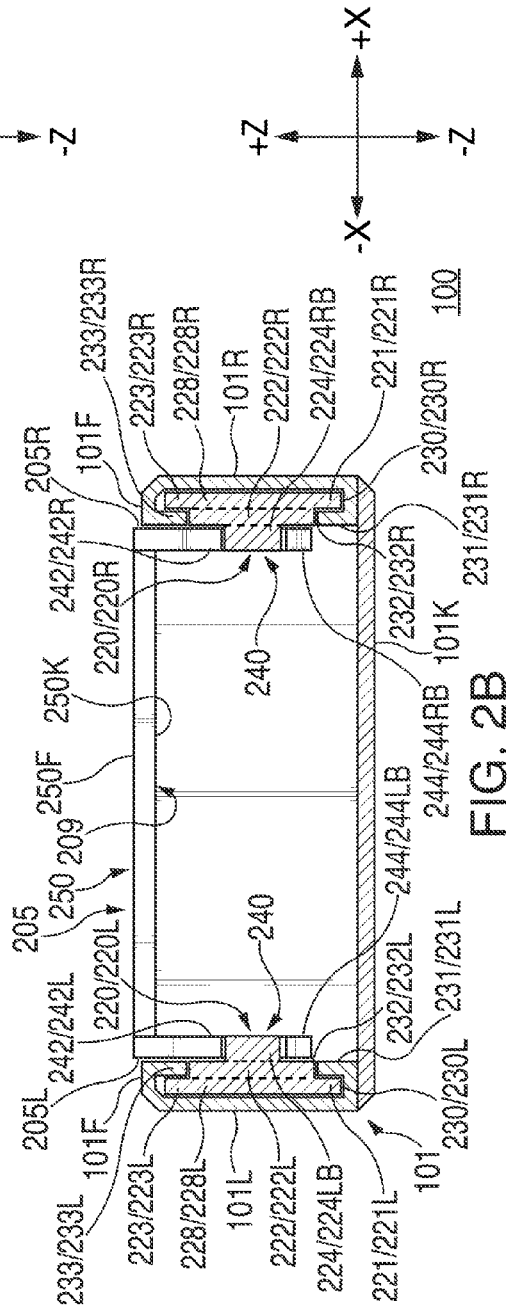

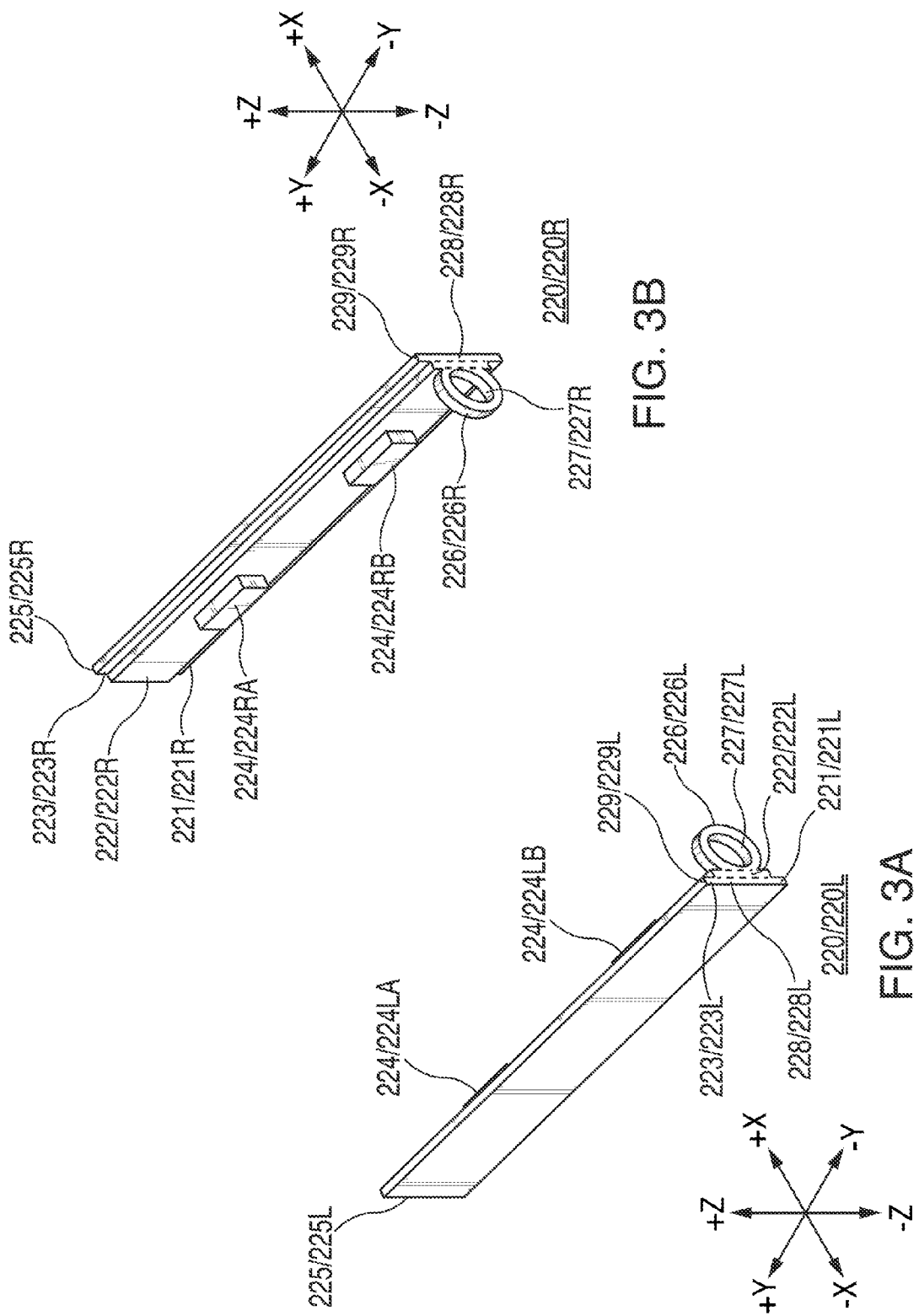

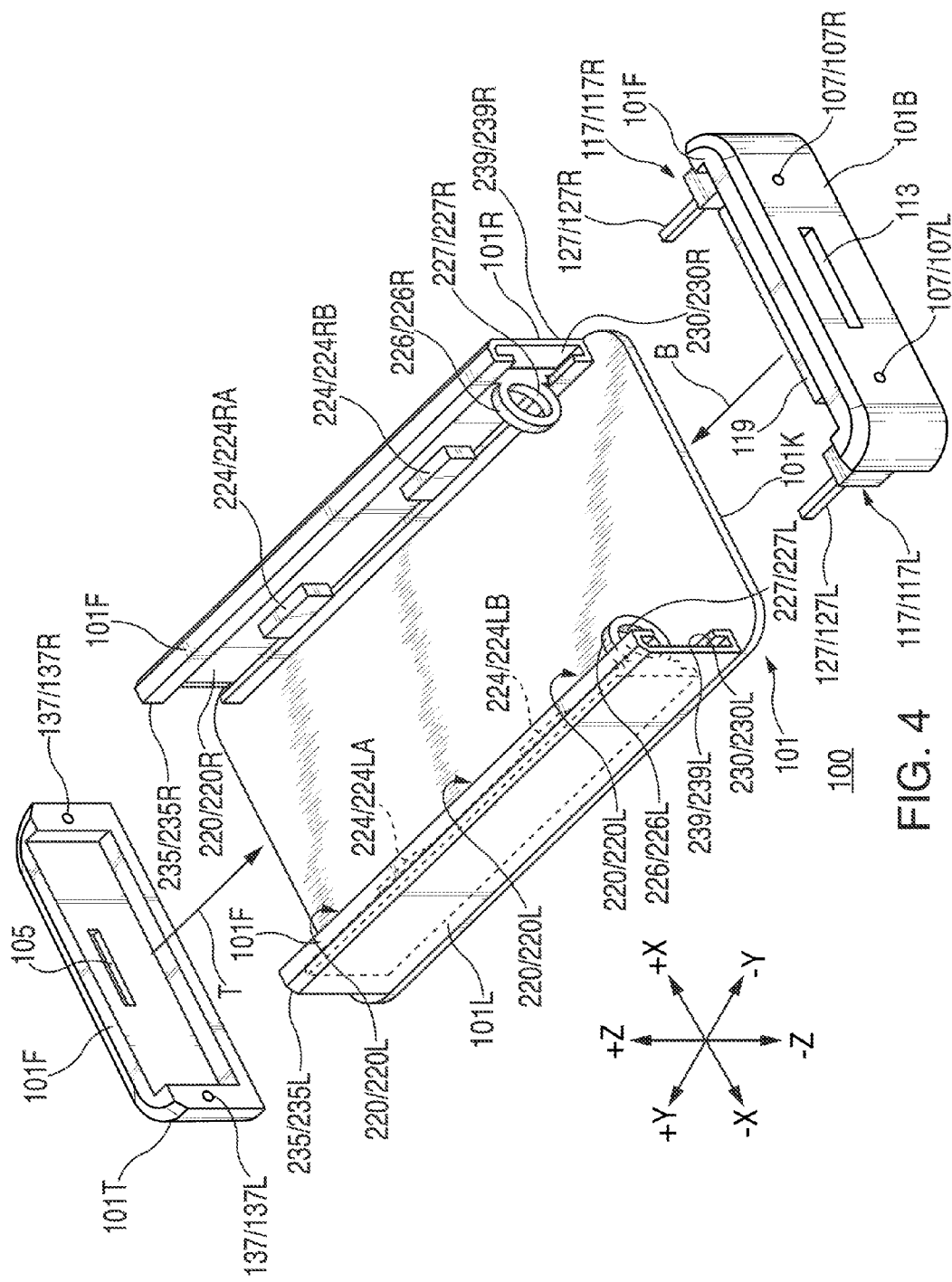

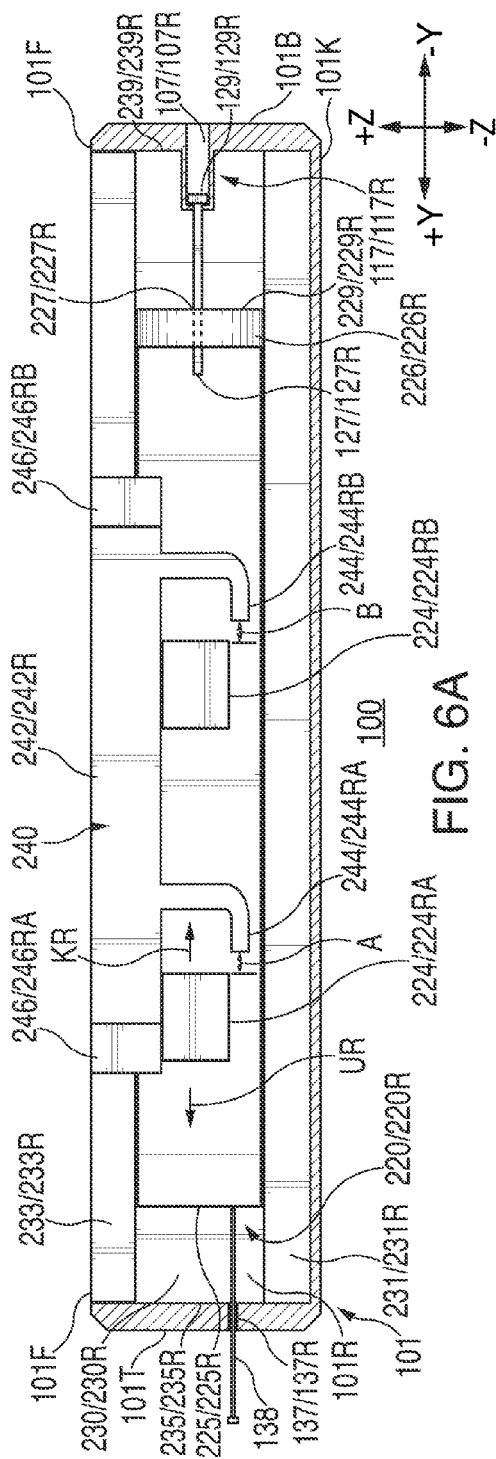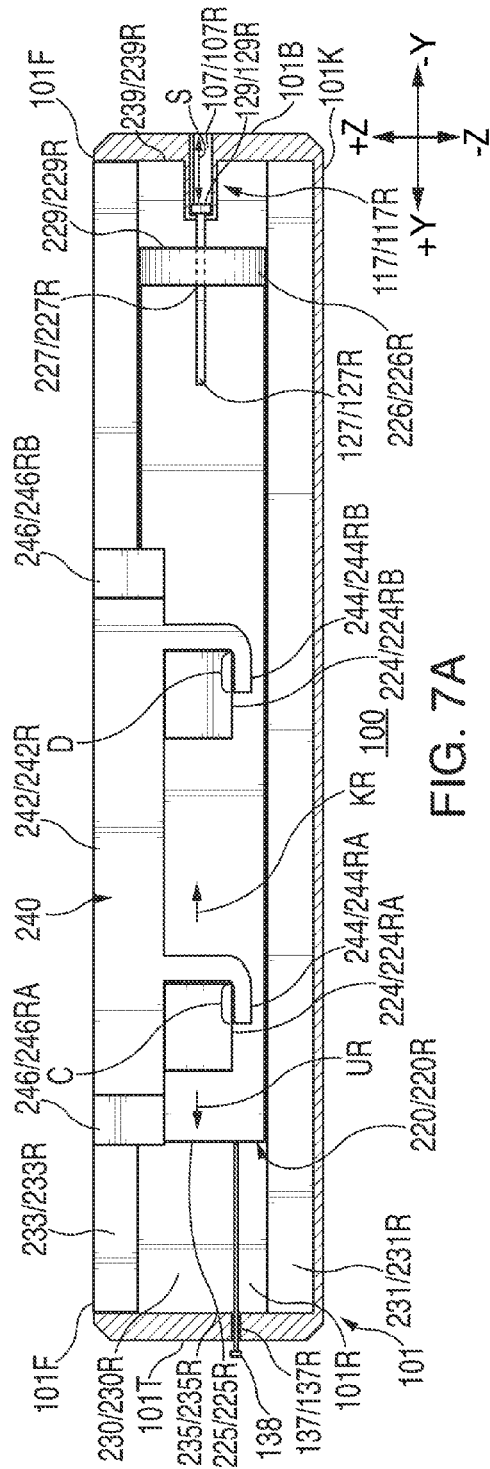

800

RESTING A COVER IN A FIRST COVER POSITION
ON A PORTION OF AN ELECTRONIC DEVICE
WITHIN AN OPENING
802

MOVING A LOCK COMPONENT FROM A FIRST
LOCK POSITION TO A SECOND LOCK POSITION
FOR SECURING THE COVER IN THE FIRST COVER
POSITION
804

900

```
┌─────────────────────────────────────────┐
│ PROVIDING A FIRST LOCK PATH USING AT    │
│ LEAST A FIRST PATH COMPONENT OF AN      │
│ ELECTRONIC DEVICE                       │
│ 902                                     │
└─────────────────────────────────────────┘
                    ↓
┌─────────────────────────────────────────┐
│ INSERTING A FIRST LOCK COMPONENT INTO   │
│ THE FIRST LOCK PATH AT A FIRST END OF   │
│ THE FIRST LOCK PATH                     │
│ 904                                     │
└─────────────────────────────────────────┘
                    ↓
┌─────────────────────────────────────────┐
│ POSITIONING A COVER ASSEMBLY ADJACENT   │
│ THE FIRST PATH COMPONENT                │
│ 906                                     │
└─────────────────────────────────────────┘
                    ↓
┌─────────────────────────────────────────┐
│ MOVING THE FIRST LOCK COMPONENT ALONG   │
│ THE FIRST LOCK PATH FROM A FIRST        │
│ POSITION TO A SECOND POSITION, WHERE    │
│ THE FIRST LOCK COMPONENT ALLOWS         │
│ MOVEMENT OF THE COVER ASSEMBLY IN A     │
│ FIRST DIRECTION WITH RESPECT TO THE     │
│ FIRST PATH COMPONENT WHEN THE FIRST     │
│ LOCK COMPONENT IS IN THE FIRST          │
│ POSITION, AND WHERE THE FIRST LOCK      │
│ COMPONENT PREVENTS MOVEMENT OF THE      │
│ COVER ASSEMBLY IN THE FIRST DIRECTION   │
│ WITH RESPECT TO THE FIRST PATH          │
│ COMPONENT WHEN THE FIRST LOCK           │
│ COMPONENT IS IN THE SEOND POSITION      │
│ 908                                     │
└─────────────────────────────────────────┘
```

FIG. 9

SYSTEMS AND METHODS FOR SECURING COMPONENTS OF AN ELECTRONIC DEVICE

FIELD OF THE INVENTION

This can relate to systems and methods for securing components of an electronic device.

BACKGROUND OF THE DISCLOSURE

Some electronic devices include a housing with an opening through which at least a portion of a device component may be provided. Often times, the device component may be somewhat fragile (e.g., made of glass), such that techniques for securing the component to the housing can create destructive strain or stress on the component.

SUMMARY OF THE DISCLOSURE

Systems and methods for securing components of an electronic device are provided.

In some embodiments, there may be provided an electronic device that may include a housing having an opening, a cover resting on a portion of the electronic device in a first cover position within the opening, and a lock component configured to move within the housing from a first lock position to a second lock position for securing the cover in the first cover position.

In other embodiments, there may be provided a method of assembling an electronic device. The method may include providing a first lock path using at least a first path component of the electronic device, inserting a first lock component into the first lock path at a first end of the first lock path, positioning a cover assembly adjacent the first path component, and, after the positioning, moving the first lock component along the first lock path from a first position to a second position. The first lock component may allow movement of the cover assembly in a first direction with respect to the first path component when the first lock component is in the first position, and the first lock component may prevent movement of the cover assembly in the first direction with respect to the first path component when the first lock component is in the second position.

In yet other embodiments, there may be provided a method for securing a cover to an electronic device, where the electronic device may include a lock component within a housing having an opening. The method may include resting the cover in a first cover position on a portion of the electronic device within the opening, and, after the resting, moving the lock component from a first lock position to a second lock position for securing the cover in the first cover position.

BRIEF DESCRIPTION OF THE DRAWINGS

The above and other aspects of the invention, its nature, and various features will become more apparent upon consideration of the following detailed description, taken in conjunction with the accompanying drawings, in which like reference characters may refer to like parts throughout, and in which:

FIG. 2A is a cross-sectional view of the electronic device of FIGS. 1 and 2, taken from line IIA-IIA of FIG. 2, in accordance with some embodiments of the invention;

FIG. 2B is a cross-sectional view of the electronic device of FIGS. 1-2A, taken from line IIB-IIB of FIG. 2, in accordance with some embodiments of the invention;

FIGS. 3A and 3B are front, bottom, left perspective views of lock components of the electronic device of FIGS. 1-3, in accordance with some embodiments of the invention;

FIG. 4 is a front, bottom, left perspective view of the electronic device of FIGS. 1-3, in a second stage of assembly, in accordance with some embodiments of the invention;

FIG. 6A is a cross-sectional view of the electronic device of FIGS. 1-6, taken from line VIA-VIA of FIG. 6, in accordance with some embodiments of the invention;

FIG. 7A is a cross-sectional view of the electronic device of FIGS. 1-7, taken from line VIIA-VIIA of FIG. 7, in accordance with some embodiments of the invention; and FIGS. 8 and 9 are flowcharts of illustrative processes for securing a component of an electronic device, in accordance with some embodiments of the invention.

DETAILED DESCRIPTION OF THE DISCLOSURE

Systems and methods for securing components of an electronic device are provided and described with reference to FIGS. 1-9.

Figure 1:
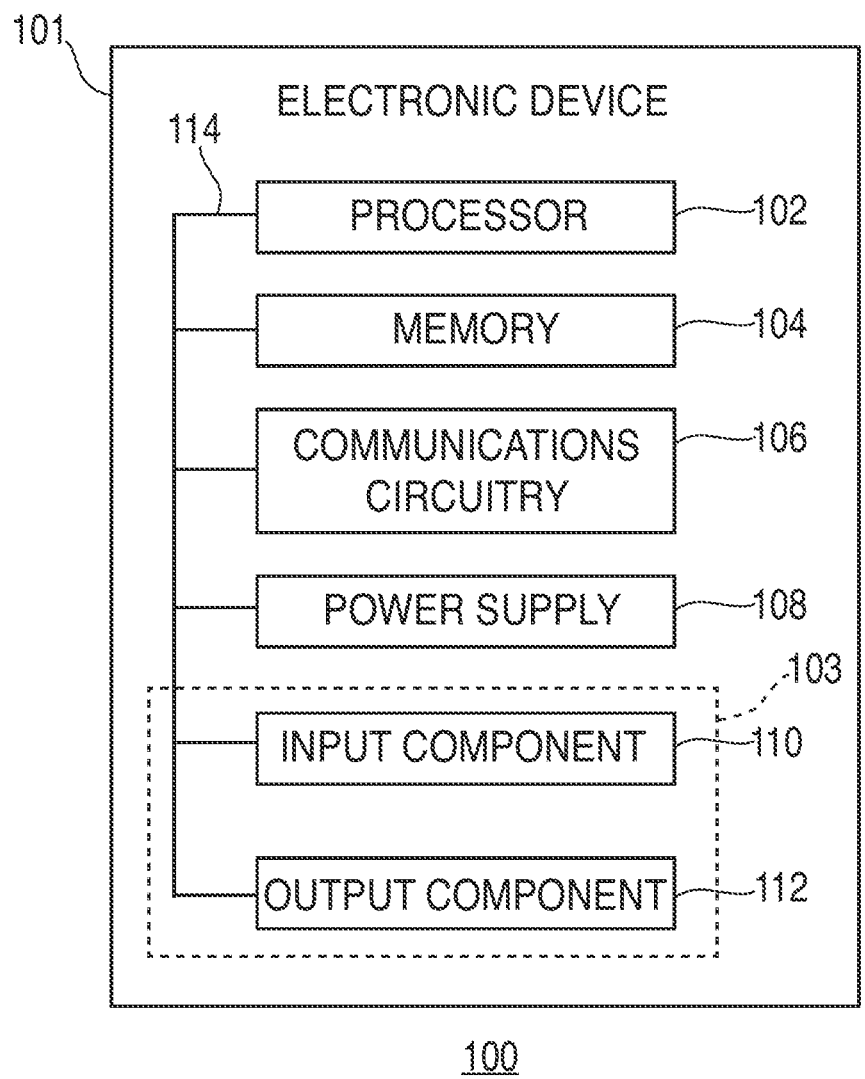
FIG. 1 is a schematic view of an illustrative electronic device, in accordance with some embodiments of the invention.

FIG. 1 is a schematic view of an illustrative electronic device 100 in accordance with some embodiments of the invention. Electronic device 100 may be any portable, mobile, or hand-held electronic device. Alternatively, electronic device 100 may not be portable, but may instead be generally stationary. Electronic device 100 can include, but is not limited to, a music player (e.g., an iPod™ available by Apple Inc. of Cupertino, Calif.), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, server, etc.), tablet (e.g., an iPad™ available by Apple Inc.), monitor, television, stereo equipment, set up box, set-top box, boom box, modem, router, printer, and combinations thereof. In some cases, electronic device 100 may perform a single function (e.g., an electronic device dedicated to capturing images) and in other cases, electronic device 100 may perform several functions (e.g., an electronic device that captures images, plays music, displays video, stores pictures, and receives and transmits telephone calls). In some embodiments, electronic device 100 may be considered a miniature electronic device that may have a form factor that is smaller than that of hand-held electronic devices, such as an iPod™. Illustrative miniature electronic devices can be integrated into various objects that include, but are not limited to, watches, rings, necklaces, belts, accessories for belts, headsets, accessories for shoes, virtual reality devices, other wearable electronics, accessories for sporting equipment, accessories for fitness equipment, key chains, or any combination thereof.

Electronic device 100 may include a processor or control circuitry 102, memory 104, communications circuitry 106, a power supply 108, an input component 110, and an output component 112. Electronic device 100 may also include a bus 114 that may provide one or more wired or wireless communication links or paths for transferring data and/or power to, from, or between various other components of device 100. In some embodiments, one or more components of electronic device 100 may be combined or omitted. Moreover, electronic device 100 may include other components not combined or included in FIG. 1. For example, electronic device 100 may include motion-sensing circuitry, a compass, positioning circuitry, or several instances of the components shown in FIG. 1. For the sake of simplicity, only one of each of the components is shown in FIG. 1.

Memory 104 may include one or more storage mediums, including for example, a hard-drive, flash memory, permanent memory such as read-only memory ("ROM"), semipermanent memory such as random access memory ("RAM"), any other suitable type of storage component, or any combination thereof. Memory 104 may include cache memory, which may be one or more different types of memory used for temporarily storing data for electronic device applications. Memory 104 may store media data (e.g., music and image files), software (e.g., for implementing functions on device 100), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications circuitry 106 may be provided to allow device 100 to communicate with one or more other electronic devices using any suitable communications protocol. For example, communications circuitry 106 may support Wi-Fi (e.g., an 802.11 protocol), Ethernet, Bluetooth™, high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), hypertext transfer protocol ("HTTP"), BitTorrent™, file transfer protocol ("FTP"), real-time transport protocol ("RTP"), real-time streaming protocol ("RTSP"), secure shell protocol ("SSH"), any other communications protocol, or any combination thereof. Communications circuitry 106 may also include circuitry that can enable device 100 to be electrically coupled to another device (e.g., a host computer or an accessory device) and communicate with that other device, either wirelessly or via a wired connection.

Power supply 108 may provide power to one or more of the components of device 100. In some embodiments, power supply 108 can be coupled to a power grid (e.g., when device 100 is not a portable device, such as a desktop computer). In some embodiments, power supply 108 can include one or more batteries for providing power (e.g., when device 100 is a portable device, such as a cellular telephone). As another example, power supply 108 can be configured to generate power from a natural source (e.g., solar power using solar cells).

One or more input components 110 may be provided to permit a user to interact or interface with device 100. For example, input component 110 can take a variety of forms, including, but not limited to, a touch pad, dial, click wheel, scroll wheel, touch screen, one or more buttons (e.g., a keyboard), mouse, joy stick, track ball, microphone, camera, proximity sensor, light detector, motion sensor, and combinations thereof. Each input component 110 can be configured to provide one or more dedicated control functions for making selections or issuing commands associated with operating device 100.

Electronic device 100 may also include one or more output components 112 that may present information (e.g., graphical, audible, and/or tactile information) to a user of device 100. Output component 112 of electronic device 100 may take various forms, including, but not limited to, an audio speaker, headphone, audio line-out, video line-out, visual display, antenna, infrared port, rumbler, vibrator, and combinations thereof. Each output component 112 can be configured to provide information from one or more other components of device 100 (e.g., processor 102) to a user of device 100.

It should be noted that one or more input components 110 and one or more output components 112 may sometimes be referred to collectively herein as an input/output ("I/O") component or I/O interface. For example, input component 110 and output component 112 may sometimes be a single I/O component 103, such as a touch screen, that may receive input information through a user's touch of a display screen and that may also provide visual information to a user via that same display screen.

Processor 102 of device 100 may include any processing circuitry operative to control the operations and performance of one or more components of electronic device 100. For example, processor 102 may be used to run operating system applications, firmware applications, graphics editing applications, media playback applications, media editing applications, or any other application. In some embodiments, processor 102 may receive input signals from input component 110 and/or drive output signals through output component 112. Processor 102 may load a user interface program (e.g., a program stored in memory 104 or in another device or server accessible by device 100) to determine how instructions or data received via an input component 110 may manipulate the way in which information is stored and/or provided to the user via an output component 112.

Electronic device 100 may also be provided with a housing 101 that may at least partially enclose one or more of the components of device 100 for protection from debris and other degrading forces external to device 100. In some embodiments, one or more of the components may be provided within its own housing (e.g., input component 110 may be an independent keyboard or mouse within its own housing that may wirelessly or through a wire communicate with processor 102, which may be provided within its own housing).

Figure 2:
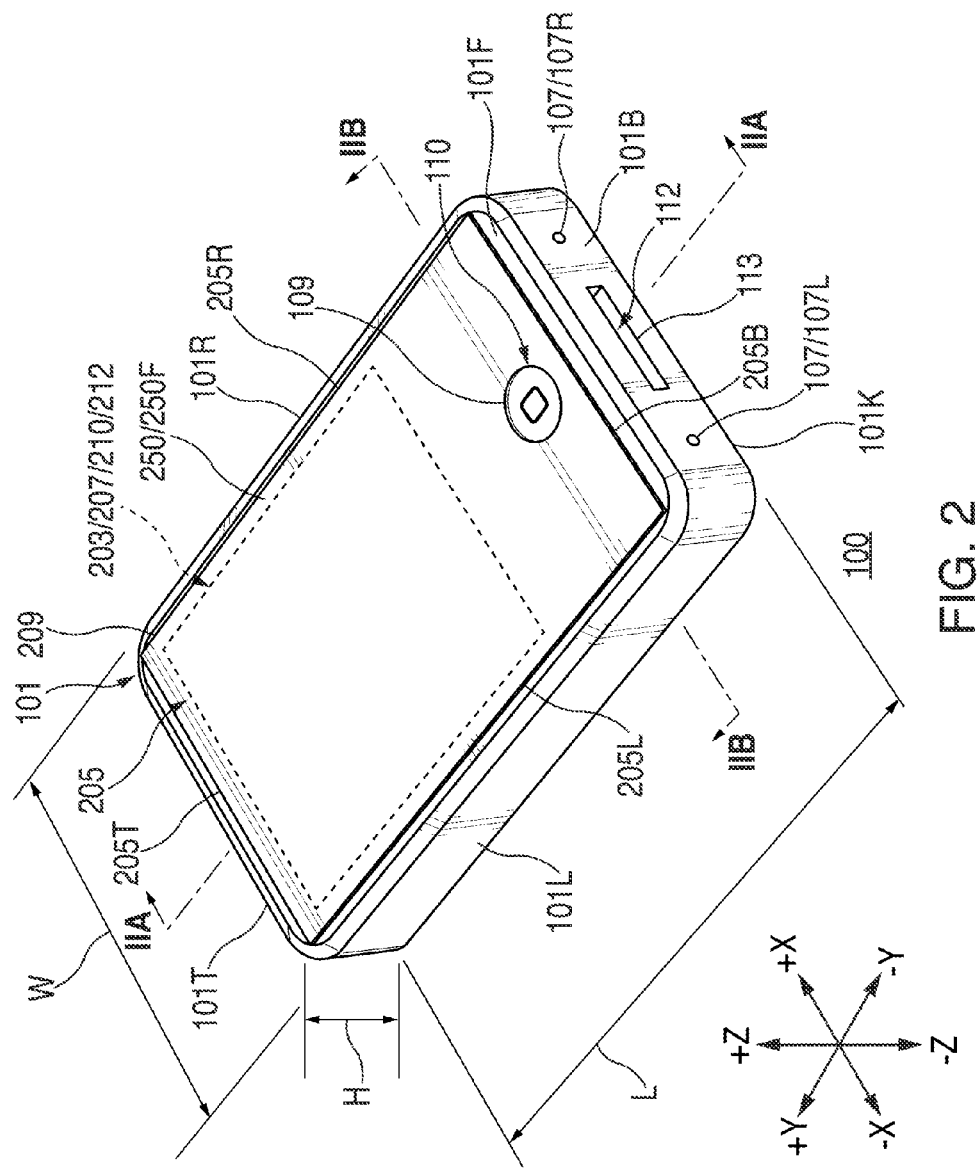
FIG. 2 is a front, bottom, left perspective view of the electronic device of FIG. 1, in a final stage of assembly, in accordance with some embodiments of the invention.

FIG. 2 is a perspective view of a fully assembled electronic device 100 in accordance with some embodiments of the invention. As shown, electronic device 100 can include at least a first input component 110 and a first output component 112. Moreover, as shown, electronic device 100 may also include a second input component 210 and a second output component 212. In some embodiments, second input component 210 and second output component 212 may be an I/O component 203. As shown in FIG. 2, housing 101 may at least partially enclose input component 110, output component 112, and I/O component 203 of device 100. Housing 101 may be any suitable shape and may include any suitable number of walls. In some embodiments, as shown in FIG. 2, for example, housing 101 may be of a generally hexahedral shape and may include a bottom wall 101B, a top wall 101T that may be opposite bottom wall 101B, a left wall 101L, a right wall 101R that may be opposite left wall 101L, a front wall 101F, and a back wall 101K that may be opposite front wall 101F. As shown in FIG. 2, for example, the size of device 100 may be defined along the X-axis by an overall housing width W of housing 101 that may extend between left surface 101L and right surface 101R, along the Y-axis by an overall housing length L of housing 101 that may extend between top surface 101T and bottom surface 101B, and along the Z-axis by an overall housing height H of housing 101 that may extend between front surface 101F and back surface 101K.

As shown in FIG. 2, for example, first input component 110 may be a mechanical button assembly, and first output component 112 may be an audio jack assembly (e.g., for receiving a plug of a headset). Although, it is to be understood that in other embodiments, first input component 110 may be any other suitable type of input component and first output component 112 may be any other suitable type of output component. At least a portion of a cover assembly 205 may be positioned within an opening 209, which may be provided through front surface 101F of housing 101, and a button 118 of first input component 110 may be positioned at least partially under or through an opening 109, which may be provided through cover assembly 205. First output component 112 may be positioned at least partially under or through an opening 113, which may be provided through bottom surface 101B of housing 101. Although, in other embodiments, it is to be understood that each one of first input component 110 and second input component 112 may be provided through any other surface of housing 101.

As also shown in FIG. 2, for example, second input component 210 and second output component 212 of I/O component 203 may be a touch screen (e.g., a multi-touch screen), that may receive input information through a user's touch of a display screen and that may also provide visual information to a user via that same display screen. For example, second input component 210 of I/O component 203 may be a touch assembly and second output component 212 of I/O component 203 may be a display assembly, where the display assembly and touch assembly may be integrated with one another and or provided in a stacked configuration (e.g., along the Z-axis). Display output component 212 may include any suitable type of display or interface for presenting visual data to a user. In some embodiments, display output component 212 may include a display embedded in device 100. Display output component 212 may include, for example, a liquid crystal display ("LCD"), a light emitting diode ("LED") display, an organic light-emitting diode ("OLED") display, a surface-conduction electron-emitter display ("SED"), a carbon nano- tube display, a nanocrystal display, any other suitable type of display, or combination thereof. In some embodiments, display output component 212 may include display driver circuitry, circuitry for driving display drivers, or both. Display output component 212 can be operative to display content (e.g., media playback information, application screens for applications implemented on electronic device 100, information regarding ongoing communications operations, information regarding incoming communications requests, device operation screens, etc.) that may be under the direction of processor 102. Display output component 212 can be associated with any suitable characteristic dimensions that may define the size and shape of an active display region or viewable screen 207 that may be visible by a user of device 100 through a portion of cover assembly 205.

Cover assembly 205 may include a cover plate 250 and a cover frame 240 that may be coupled to and support at least a portion of cover plate 250. For example, in some embodiments, cover plate 250 may be formed by any suitable material or combination of materials, such as glass or any other at least partially transparent material, that may allow for active display region or viewable screen 207 to be visible by a user of device 100 through a portion of cover assembly 205. Cover frame 240 may be any suitable material or combination of materials, such as insert molded plastic and/or metal, that may be coupled to cover plate 250 (e.g., via glue) and that may provide support for cover plate 250. As shown, a front surface 250F of cover plate 250 may form an exterior portion of cover assembly 205 that may be exposed to a user of device 100 (e.g., within opening 209), while cover frame 240 may be coupled to one or more portions of a back surface 250K of cover plate 250 for providing support for cover plate 250.

Cover assembly 205 and/or opening 209 may be any suitable shape. In some embodiments, as shown in FIG. 2, cover assembly 205 and opening 209 may each be substantially rectangular at a cross-section (e.g., in an X-Y plane). For example, a top edge 205T of cover assembly 205 may run parallel to top surface 101T of housing 101, a bottom edge 205B of cover assembly 205 may run parallel to bottom surface 101B of housing 101, a left edge 205L of cover assembly 205 may run parallel to left surface 101L of housing 101, and/or a right edge 205R of cover assembly 205 may run parallel to right surface 101R of housing 101. Alternatively, cover assembly 205 can be defined by a curved or other non-polygonal shape (e.g., circular) that may fit within and/or be at least partially provided through opening 209.

Certain geometries of cover assembly 205 (e.g., edges 205T, 205B, 205L, and 205R) may be sized and shaped to snugly fit within opening 209 of housing 101, such that cover assembly 205 may be held in a functional and/or fully assembled position with respect to housing 101 (e.g., along the X-axis and/or along the Y-axis). For example, as shown in FIGS. 2 and 2A, once cover assembly 205 has been deposited in its functional and/or fully assembled position within opening 209 of housing 101, cover assembly 205 may be prevented from moving along the Y-axis (e.g., in either the +Y-direction or in the −Y-direction) by one or more portions of device 100 (e.g., one or more portions of housing 101 that may define at least a portion of opening 209). Moreover, as shown in FIGS. 2 and 2B, once cover assembly 205 has been deposited in its functional and/or fully assembled position within opening 209 of housing 101, cover assembly 205 may be prevented from moving along the X-axis (e.g., in either the +X-direction or in the −X-direction) by one or more portions of device 100 (e.g., one or more portions of housing 101 that may define at least a portion of opening 209). However, one or more additional components may be provided within housing 101 to prevent cover assembly 205 from moving out of its functional and/or fully assembled position along the Z-axis (e.g., the axis along which opening 209 may be provided through housing 101 (e.g., perpendicularly through front surface 101F of housing 101)).

In some embodiments, as shown in FIGS. 2A-7A, for example, electronic device 100 may include a system within housing 101 for securing cover assembly 205 to device 100 (e.g., within opening 209 of housing 101). As shown, device 100 may include at least one lock component 220 that may be configured to move within housing 101 from a first position to a second position after cover assembly 205 has been positioned within opening 209 (e.g., in its functional and/or fully assembled position of FIGS. 2-2B). For example, lock component 220 may be configured to be moved from a first position where lock component 220 may allow cover assembly 205 to be positioned in its functional position within opening 209 of housing 101, to a second position where lock component 220 may interact with cover assembly 205 to prevent cover assembly 205 from moving out of its functional position in at least one direction (e.g., in the +Z-direction and/or in the −Z-direction). Lock component 220 may be locked, held, or otherwise maintained in its second position before device 100 may be provided to an end user such that cover assembly 205 may be secured in its functional position within opening 209. Lock component 220 may be formed by any suitable material or combination of materials, such as plastic or metal, that may be strong enough to interact with cover assembly 205 for preventing cover assembly 205 from moving out of its functional position.

One or more various portions of one or more suitable components of device 100 may at least partially define a lock path 230 along which a respective lock component 220 may move from its first position to its second position for locking cover assembly 205 in its functional position within opening 209. For example, one or more housing portions of housing 101 may be configured to define at least a portion of a lock path 230. Alternatively, another device component distinct from housing 101 may be configured to define at least a portion of a lock path 230. Lock path 230 may allow any suitable movement of lock component 220 from its first position to its second position. In some embodiments, lock path 230 may be linear for allowing only linear movement of lock component 220 for securing cover assembly 205. In other embodiments, lock path 230 may be any other suitable shape for allowing any other suitable movement of lock component 220 from its first position to its second position (e.g., rotational movement) for securing cover assembly 205.

In some particular embodiments, as shown, device 100 may include at least one lock path 230 (e.g., one or more of lock paths 230L and 230R) that may be provided by a housing component of housing 101 between a first path end 235 and a second path end 239. For example, a first lock path 230L may be provided along the interior of left housing wall 101L as a "C-shaped" path opening 232L that may be defined by a lower path hook 231L and an upper path hook 233L of left housing wall 101L. Alternatively, one or both of hooks 231L and 233L may be provided by various other components of device 100 other than left housing wall 101L. Lock path 230L may extend between a first path end 235L and a second path end 239L. Similarly, in some embodiments, as shown, another lock path 230R may be provided along the interior of right housing wall 101R as a "C-shaped" path opening 232R that may be defined by a lower path hook 231R and an upper path hook 233R of right housing wall 101R. Alternatively, one or both of hooks 231R and 233R may be provided by various other components of device 100 other than right housing wall 101R. Lock path 230R may extend between a first path end 235R and a second path end 239R. Although each lock path 230 may be shown as having a "C-shaped" path opening 232 defined by a lower path hook 231 and an upper path hook 233, it is to be understood that each lock path 230 may be of any other suitable shape that may receive and allow movement therealong of lock component 220 from a first position to a second position.

In some particular embodiments, as shown, device 100 may include at least one lock component 220 (e.g., one or more of lock components 220L and 220R) that may extend between a first lock end 225 and a second lock end 229 and that may be positioned at least partially within a path opening 232 of a lock path 230 between first path end 235 and second path end 239, such that lock component 220 may move along lock path 230 from a first position to a second position. For example, as shown, a first lock component 220L may include a lock body 228L extending along the Y-axis between a first lock end 225L and a second lock end 229L, and along the Z-axis between a lower lock edge 221L and an upper lock edge 223L, which may be shaped or otherwise configured to be retained within and moved along path opening 232L of lock path 230L between path ends 235L and 239L. Moreover, lock component 220L may also include a lock extension 222L that may extend away from lock body 228L and out of path opening 232L. At least one lock retention feature 224L (e.g., one or more of lock retention features 224LA and 224LB) may be provided along lock extension 222L for interacting with a retention feature of cover assembly 205 when lock component 220L is moved to its second position for securing cover assembly 205. Additionally, in some embodiments, lock component 220L may include at least one lock motion feature 226L (e.g., along lock extension 222L) that may be configured to interact with a device motion component of device 100 (e.g., device motion component 117L of FIGS. 4 and 5) for moving lock component 220L along lock path 230L from a first position to a second position for securing cover assembly 205.

Similarly, as shown, device 100 may additionally or alternatively include another lock component 220R that may include a lock body 228R extending along the Y-axis between a first lock end 225R and a second lock end 229R, and along the Z-axis between a lower lock edge 221R and an upper lock edge 223R, which may be shaped or otherwise configured to be retained within and moved along path opening 232R of lock path 230R between path ends 235R and 239R. Lock component 220R may also include a lock extension 222R that may extend away from lock body 228R and out of path opening 232R. At least one lock retention feature 224R (e.g., one or more of lock retention features 224RA and 224RB) may be provided along lock extension 222R for interacting with a retention feature of cover assembly 205 when lock component 220R is moved to its second position for securing cover assembly 205. Additionally, in some embodiments, lock component 220R may include at least one lock motion feature 226R (e.g., along lock extension 222R) that may be configured to interact with a device motion component of device 100 (e.g., device motion component 117R of FIGS. 4 and 5) for moving lock component 220R along lock path 230R from a first position to a second position for securing cover assembly 205. Although each lock component 220 may be shown as having a flat lock body 228 extending along the Y-axis between a first lock end 225 and a second lock end 229, and along the Z-axis between a lower lock edge 221 and an upper lock edge 223, with a lock extension 222, at least one lock retention feature 224, and at least one lock motion feature 226, it is to be understood that each lock component 220 may be of any other suitable shape that may be received by any suitable lock path 230 and that may be moved therealong from a first position to a second position for securing cover assembly 205.

Figure 5:
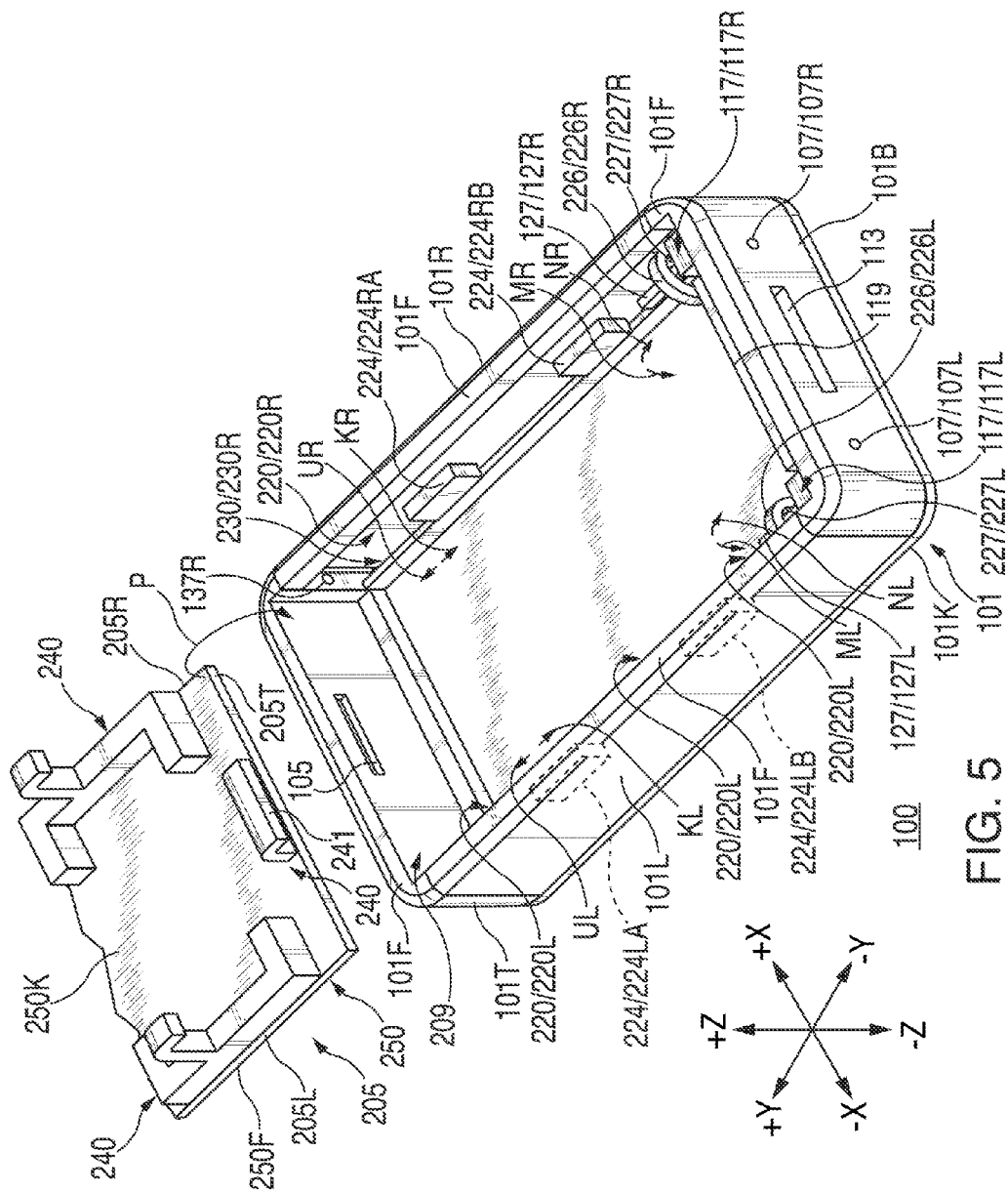
FIG. 5 is a front, bottom, left perspective view of the electronic device of FIGS. 1-4, in a third stage of assembly, in accordance with some embodiments of the invention.
Figure 5A:
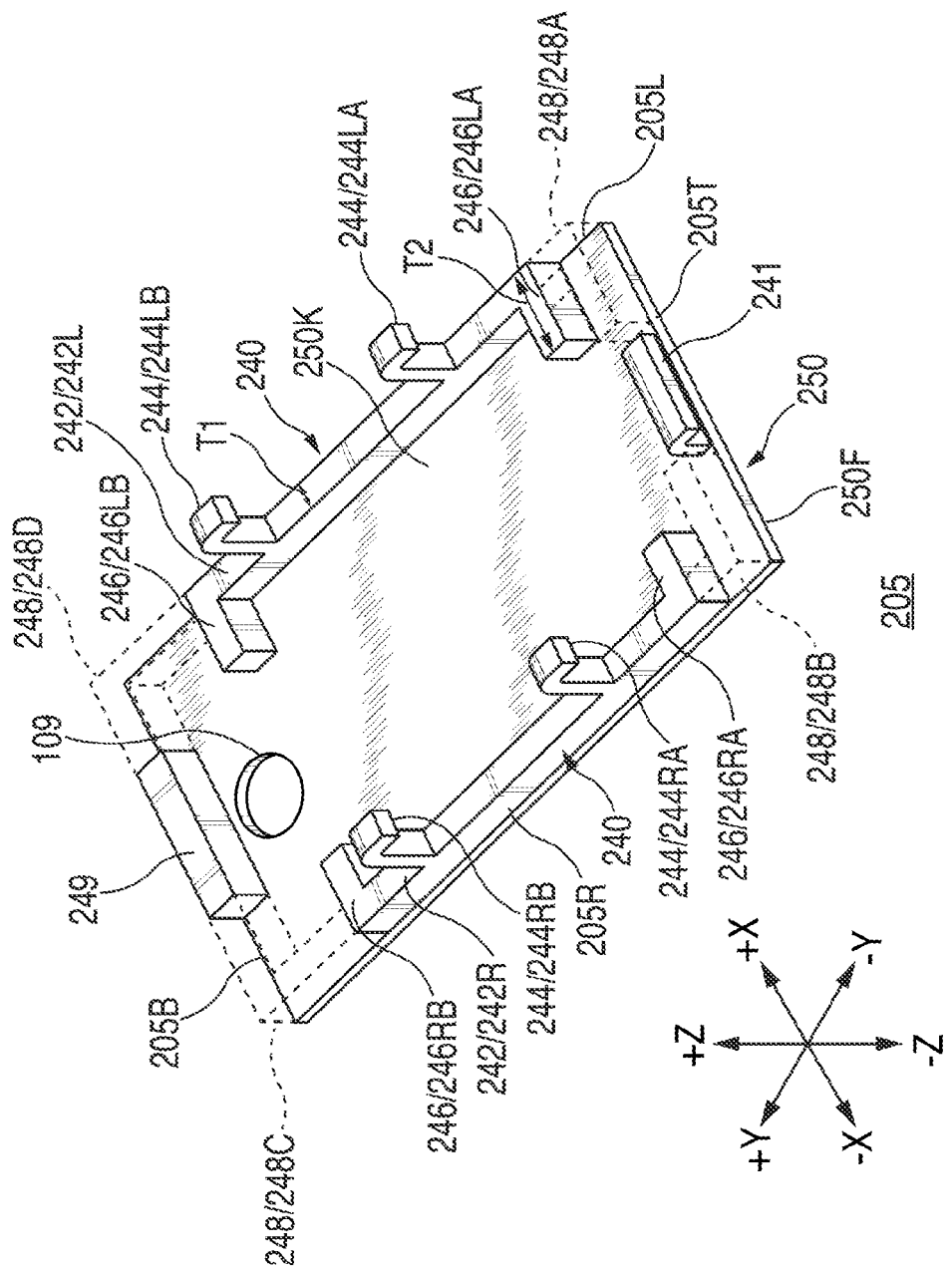
FIG. 5A is back, top, right perspective view of a cover assembly of the electronic device of FIGS. 1-5, in accordance with some embodiments of the invention.

Cover frame 240 of cover assembly 205 may include various components for coupling to cover plate 250 and/or for interacting with various other components of electronic device 100 (e.g., for engaging with at least a portion of lock component 220 when lock component 220 is moved to its second position for securing cover assembly 205). For example, as shown in FIG. 5A, cover frame 240 may include at least one frame rail 242 (e.g., one or more of frame rails 242L and 242R) for coupling to and structurally supporting cover plate 250. In some embodiments, a first frame rail 242L may be coupled (e.g., via glue) to back surface 250K of cover plate 250 adjacent and along at least a portion of left edge 205L of cover assembly 205, while a second frame rail 242R may be coupled (e.g., via glue) to back surface 250K of cover plate 250 adjacent and along at least a portion of right edge 205R of cover assembly 205. Therefore, each rail 242 may provide some support along the length of cover plate 250 between top edge 205T and bottom edge 205B of cover assembly 205.

As shown in FIG. 5A, for example, each frame rail 242 (e.g., frame rail 242R) may have a thickness T1, which may be thick enough to provide support to cover plate 250 but may be thin enough to take up as little room within device 100 as possible. However, frame 240 may include at least one frame pad 246 (e.g., one or more of frame pads 246LA, 246LB, 246RA, and 246RB) that may be thicker than rail 242 in order to provide a larger surface area for coupling frame 240 to plate 250. For example, as shown, each frame pad 246 (e.g., frame pad 246LA) may have a thickness T2, which may provide a large enough surface area to guarantee an appropriate adhesion between frame 240 and back surface 250K of plate 250. For example, in some embodiments, thickness T2 may be twice as thick as thickness T1. As shown, frame pad 246LA may be positioned adjacent a first end of frame rail 242L proximate bottom edge 205B of cover assembly 205, frame pad 246LB may be positioned adjacent a second end of frame rail 242L proximate top edge 205T of cover assembly 205, frame pad 246RA may be positioned adjacent a first end of frame rail 242R proximate bottom edge 205B of cover assembly 205, and frame pad 246RB may be positioned adjacent a second end of frame rail 242R proximate top edge 205T of cover assembly 205. However, it is to be understood that any number of frame pads 246 may be provided at any suitable position or positions along the length of any one or more frame rails 242.

Moreover, as also shown in FIG. 5A, for example, cover frame 240 may also include a frame pivot 241 adjacent top edge 205T of cover assembly 205 and/or a frame head 249 adjacent bottom edge 205B of cover assembly 205, each of which may be described in more detail below. In some embodiments, in order to provide support about the entire periphery of cover plate 250, various additional frame portions 248 (e.g., additional portions 248A-248D) of cover frame 240 may be provided. For example, a first additional frame portion 248A may extend between frame pad 246LA and pivot 241, a second additional frame portion 248B may extend between pivot 241 and frame pad 246RA, a third additional frame portion 248C may extend between frame pad 246RB and frame head 249, and/or a fourth additional frame portion 248D may extend between frame head 249 and frame pad 246LB. Although, it is to be understood that each of these components of frame 240 may not be provided or may be provided in various other suitable ways for providing support to cover plate 250.

As mentioned, cover frame 240 may also include one or more components for interacting with various other components of electronic device 100, such as for interacting with at least a portion of lock component 220 (e.g., lock retention feature 224) when lock component 220 is moved to its second position for locking cover assembly 205 in its functional position within opening 209. For example, as shown in FIG. 5A, cover frame 240 may include at least one frame retention feature 244 (e.g., one or more of frame retention features 244LA, 244LB, 244RA, and 244RB) for receiving or otherwise engaging or interacting with at least a portion of a lock component 220. In some embodiments, each frame retention feature 244L (e.g., retention feature 244LA and 244LB) may extend away from frame rail 242L and each frame retention feature 244R (e.g., retention feature 244RA and 244RB) may extend away from frame rail 242R. As shown, each frame retention feature may be "hook-shaped," although it is to be understood that each frame retention feature may be any other suitable shape or any other suitable type of retention feature that may be configured to interact with a lock retention feature 224 of lock component 220 in any suitable way for securing cover assembly 205 within opening 209. Moreover, each frame retention feature 244 may be provided at any suitable portion and/or position of cover assembly 205 (e.g., directly coupled to cover plate 250, rather than extending from a frame rail 242).

Figure 6:
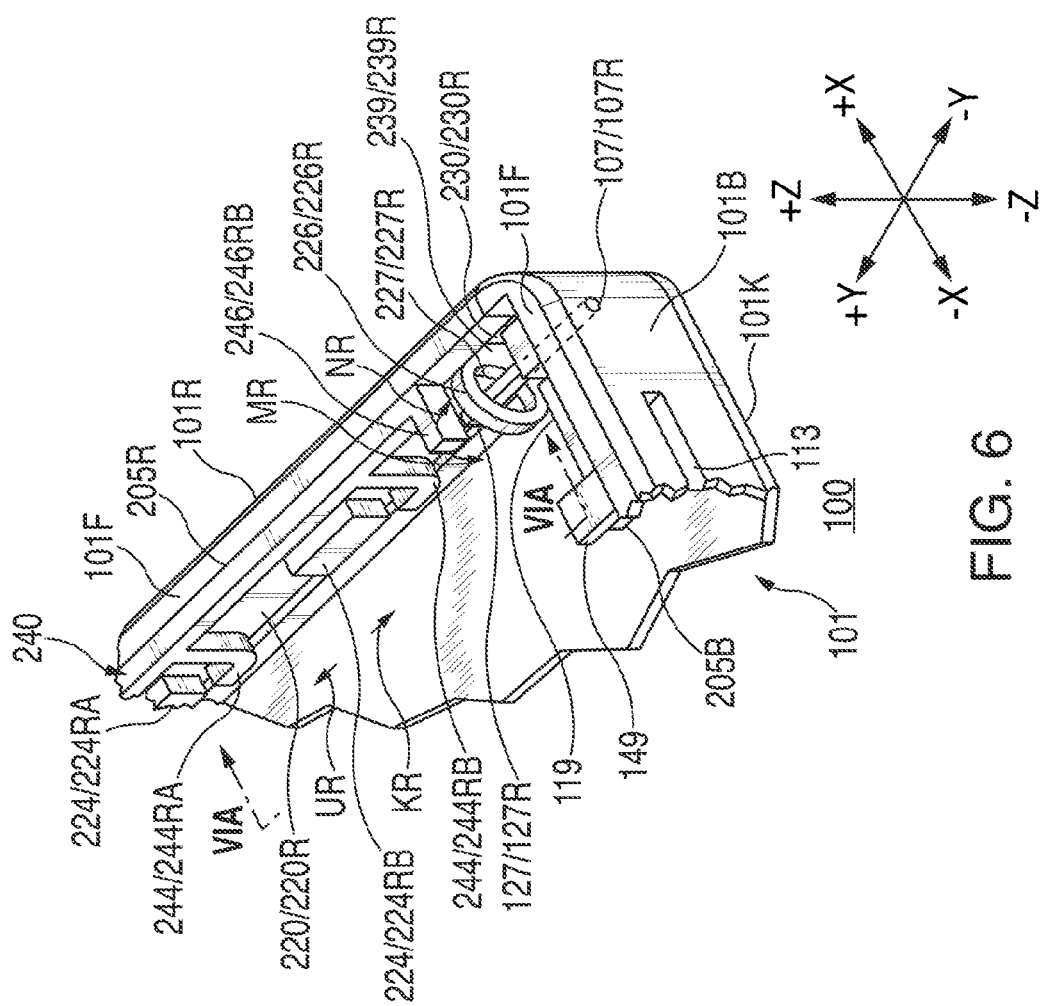
FIG. 6 is a front, bottom, left perspective view of a portion of the electronic device of FIGS. 1-5, in a fourth stage of assembly, but without a cover plate of the cover assembly for the sake of clarity, in accordance with some embodiments of the invention.

Once cover assembly 205 has been positioned within opening 209 of housing 101 (e.g., by resting at least a portion of frame 240 and/or cover plate 250 on top of any suitable portion of device 100 proximal to opening 209), lock component 220 may be moved from a first position to a second position for securing cover assembly 205 within opening 209. For example, when each lock component 220 (e.g., lock components 220L and 220R) is in a first position, as shown in FIGS. 5, 6, and 6A, cover assembly 205 may be positioned within opening 209 of housing 101. In some embodiments, as shown, frame 240 may rest on various portions of device 100 when cover assembly 205 has been positioned within opening 209. For example, as shown in FIGS. 2B, 6, and 6A, a portion of frame rail 242R may rest on top of at least a portion of lock component 220R (e.g., on top of at least a portion of lock retention feature 224RA and/or on top of at least a portion of lock retention feature 224RB). Similarly, as shown in FIG. 2B, a portion of frame rail 242L may rest on top of at least a portion of lock component 220L (e.g., on top of at least a portion of lock retention feature 224LB).

Additionally or alternatively, any suitable portion of cover frame 240 and/or of cover plate 250 of cover assembly 205 may rest on any suitable portion of any other suitable component of device 100 when cover assembly 205 has been positioned within opening 209. For example, as shown in FIGS. 2A and 6, at least a portion of frame head 249 may rest on top of at least a portion of a housing ledge 119, which may be provided by a portion of bottom housing wall 101B of housing 101 or by any other suitable component of device 100. Alternatively or additionally, as shown in FIG. 2A, at least a portion of frame pivot 241 may rest within a portion of a notch 105, which may be provided by a portion of top housing wall 101T of housing 101 or by any other suitable component of device 100. Therefore, portions of cover assembly 205 adjacent one, some, or all of edges 205T, 205B, 205L, and 205R may rest on at least a portion of device 100 when cover assembly 205 is positioned within opening 209.

In some specific embodiments, frame pivot 241 may initially interact with notch 105 for properly aligning cover assembly 205 with opening 209, and then the remainder of cover assembly 205 may be rotated at the interaction of pivot 241 with notch 105 (e.g., in the direction of arrow P of FIGS. 2A and 5 about the X-axis in the −Y-direction) until cover assembly 205 has been deposited in its functional and/or fully assembled position within opening 209 of housing 101 (e.g., as shown in FIGS. 2-2B and 6-7A). As mentioned, once cover assembly 205 has been deposited in its functional and/or fully assembled position within opening 209 of housing 101, cover assembly 205 may be prevented from moving along the Y-axis by one or more portions of device 100 (e.g., in either the +Y-direction due to an interface between top edge 205T/pivot 241 and top wall 101T/notch 105 or in the −Y-direction due to an interface between bottom edge 205B and bottom wall 101B as shown in FIGS. 2 and 2A). Moreover, as shown in FIGS. 2 and 2B, once cover assembly 205 has been deposited in its functional and/or fully assembled position within opening 209 of housing 101, cover assembly 205 may be prevented from moving along the X-axis by one or more portions of device 100 (e.g., in either the +X-direction due to an interface between right edge 205R and right wall 101R/lock component 220R or in the −X-direction due to an interface between left edge 205L and left wall 101L/lock component 220L). Moreover, in some embodiments, as shown in FIGS. 2A, 6, and 6A, once cover assembly 205 has been deposited in its functional and/or fully assembled position within opening 209 of housing 101, cover assembly 205 may be prevented from moving downwardly in the −Z-direction (e.g., due to cover assembly 205 resting on the top of one or more portions of device 100). However, as shown in FIGS. 6 and 6A, for example, cover assembly 205 may not be prevented from moving upwardly in the +Z-direction and out from within opening 209 until at least one lock component 220 has been moved from a first position to a second position (e.g., along lock path 230).

Once cover assembly 205 has been deposited in its functional and/or fully assembled position within opening 209 of housing 101, at least one lock component 220 of device 100 (e.g., one or more of lock component 220L and lock component 220R) may be moved from a first position to a second position for securing cover assembly 205 in its functional and/or fully assembled position within opening 209 of housing 101. For example, as shown in FIGS. 6 and 6A, when cover assembly 205 is initially deposited in its functional and/or fully assembled position within opening 209 of housing 101, no lock retention feature 224 of any lock component 220 may be interacting with any frame retention feature 244 of frame 240 for limiting the movement of any frame retention feature 244 in at least one direction (e.g., in the +Z-direction). Instead, each lock component 220 may be in a first position, whereby each lock retention feature 224 may be removed or otherwise disengaged from each frame retention feature 244. For example, as shown in FIGS. 6 and 6A, when lock component 220R is in a first position, lock retention feature 224RA may be spaced at least a distance A in the +Y-direction from frame retention feature 244RA, and lock retention feature 224RB may be spaced at least a distance B in the +Y-direction from frame retention feature 244RB.

Figure 7:
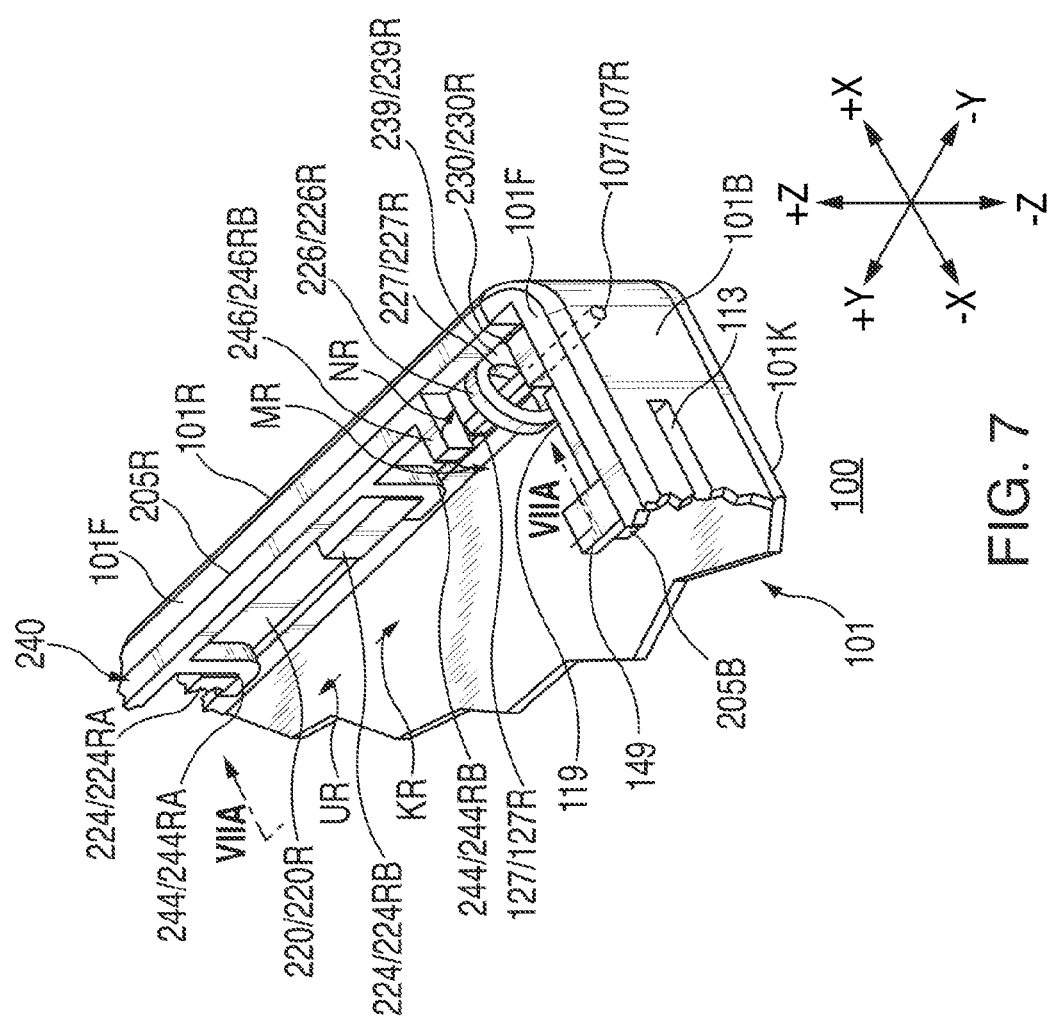
FIG. 7 is a front, bottom, left perspective view of a portion of the electronic device of FIGS. 1-6, in a fifth stage of assembly, but without the cover plate of the cover assembly for the sake of clarity, in accordance with some embodiments of the invention.

However, once cover assembly 205 has been properly deposited in its functional and/or fully assembled position within opening 209 of housing 101, at least one lock component 220 of device 100 (e.g., one or more of lock component 220L and lock component 220R) may be moved from its first position to a second position for securing cover assembly 205 in its functional and/or fully assembled position within opening 209 of housing 101. For example, as shown in FIGS. 2B, 7 and 7A, once cover assembly 205 has been properly deposited in its functional and/or fully assembled position within opening 209 of housing 101, at least one lock retention feature 224 of at least one lock component 220 may be moved to its second position for interacting with or otherwise engaging a frame retention feature 244 of frame 240 for limiting the movement of frame retention feature 244 in at least one direction (e.g., in the +Z-direction). Particularly, as shown in FIGS. 2B, 7 and 7A, when lock component 220R is moved in the direction of arrow KR to a second position (e.g., along path 230R), lock retention feature 224RA may be positioned within hook-shaped frame retention feature 244RA of frame 240 (e.g., by at least a distance C along the Y-axis), and lock retention feature 224RB may be positioned within hook-shaped frame retention feature 244RB of frame 240 (e.g., by at least a distance D along the Y-axis). This engagement or interaction between a lock retention feature 224 of a lock component 220 and a frame retention feature 244 of frame 240 may prevent frame 240 from moving in the +Z-direction with respect to device 100 and out from within opening 209. Similarly, when lock component 220R is moved in the direction of arrow UR back to its first position of FIGS. 6 and 6A, frame 240 may no longer be prevented from moving in the +Z-direction by lock retention features 224RA and 224RB. Although each frame retention feature 244 may be shown as hook-shaped for receiving a hexahedral lock retention feature 224, each frame retention feature 244 and each lock retention feature 224 may be any other suitable set of features that may interact or otherwise engage with one another for securing cover assembly 205 within opening 209.

Device 100 may be configured in various suitable ways to move lock component 220 from its first position to its second position for securing cover assembly 205 within opening 209. For example, in some embodiments, a tool 138 may be inserted through one or more openings 137 in top housing wall 101T (e.g., opening 137L and/or opening 137R) for pushing lock component 220 from its first position to its second position. As shown in FIGS. 6 and 7, for example, a tool 138 may be inserted through opening 137R in top housing wall 101T and may push against end 225R of lock component 220R in the direction of arrow KR for moving lock component 220R from its first position of FIG. 6 to its second position of FIG. 7 in order to secure cover assembly 205 within opening 209. In some embodiments, the geometries of retention features 224R and 244R may be configured to create a tight fit between lock component 220R and frame 240 once lock component 220R has been moved from its first position of FIGS. 6 and 6A to its second position of FIGS. 7 and 7A, thereby securing lock component 220R in its second position, and thereby securing cover assembly 205 within opening 209.

As another example, as shown, at least one device motion component 117 (e.g., device motion component 117L and/or device motion component 117R) may be provided for pulling lock component 220 from its first position to its second position. For example, as shown, each device motion component 117 may include a device motion feature 127 (e.g., device motion feature 127L and device motion feature 127R), which may be configured to interact or otherwise engage with lock motion feature 226 of lock component 220 (e.g., via a threaded lock motion opening 227). For example, in some embodiments, feature 226 and opening 227 may be an insert molded internally threaded fastener (e.g., an insert molded threaded PEM™ nut of Penn Engineering & Manufacturing Corp.). An end 129 of device motion feature 127 may be exposed and accessed through a device motion opening 107 (e.g., in bottom housing wall 101B) of housing 101 in order to rotate or otherwise move device motion feature 127 for engaging lock component 220. For example, device motion feature 127R may be a screw that may be provided through a threaded lock motion opening 227R of lock motion feature 226R. When device motion feature 127R is rotated in the direction of arrow NR of FIG. 5 (e.g., about the Y-axis in the +X-direction), device motion feature 127R may interact with threaded lock motion opening 227R to pull lock component 220R in the direction of arrow KR towards device motion feature 127R of device motion component 117R from the first position to the second position of lock component 220R. Alternatively, when device motion feature 127R is rotated in the direction of arrow MR of FIG. 5 (e.g., about the Y-axis in the −X-direction), device motion feature 127R may interact with threaded lock motion opening 227R to push lock component 220R in the direction of arrow UR away from device motion feature 127R of device motion component 117R from the second position to the first position of lock component 220R. As shown, an end 129R of device motion feature 127R may be exposed and accessed through a device motion opening 107R in bottom housing wall 101B of housing 101 in order to rotate or otherwise move device motion feature 127R for engaging lock component 220R. As shown in FIG. 7A, end 129R may be offset from housing 101 within device 100 by at least a distance S, which may provide for a more attractive outer housing 101. For example, a small tool (not shown), such as a screw driver, may be passed through a small device motion opening 107R for rotating device motion feature 127R, and then that tool may be removed, thereby enabling end 129R to be recessed within device 100.

As device motion feature 127 (e.g., a screw) is only used to push or pull lock component 220 into a second position for securing cover assembly 205, but not to secure cover assembly 205 itself, device motion feature 127 may not need to be very robust and may be small in size, thereby decreasing the size of device motion opening 107. Moreover, in some embodiments, such a screw may not be part of device 100, but may instead be part of a tool that is only used for movement of lock component 220 but is then removed from device 100 altogether. Because movement of lock component from a first position to a second position that may engage with cover assembly 205 may be movement with little to no resistance, device motion feature 127 may not need to be robust in size or strength, thereby allowing device motion component 117 to be reduced in size and impact on the overall design of device 100.

Similarly, device motion feature 127L may be a screw that may be provided through a threaded lock motion opening 227L of lock motion feature 226L. When device motion feature 127L is rotated in the direction of arrow NL of FIG. 5 (e.g., about the Y-axis in the +X-direction), device motion feature 127L may interact with threaded lock motion opening 227L to pull lock component 220L in the direction of arrow KL towards device motion feature 127L of device motion component 117L from the first position to the second position of lock component 220L. Alternatively, when device motion feature 127L is rotated in the direction of arrow ML of FIG. 5 (e.g., about the Y-axis in the −X-direction), device motion feature 127L may interact with threaded lock motion opening 227L to push lock component 220L in the direction of arrow UL away from device motion feature 127L of device motion component 117L from the second position to the first position of lock component 220L. As shown, an end of device motion feature 127L may be exposed and accessed through a device motion opening 107L in bottom housing wall 101B of housing 101 in order to rotate or otherwise move device motion feature 127L for engaging lock component 220L. Device motion feature 127 may be maintained at a current configuration with respect to lock component 220 for maintaining a current position of lock component 220 unless a tool (e.g., a screw driver, not shown) is utilized to adjust device motion feature 127 (e.g., in the direction of one of arrows MR, NR, ML, or NL) for moving lock component 220. For example, a threaded screw and nut interaction between device motion feature 127 and threaded lock motion opening 227 (e.g., for translating rotational motion about the Y-axis into lateral movement along the Y-axis) may prevent lateral movement along the Y-axis due to another force (e.g., pushing force provided by a tool 138).

Each lock component may be moved between its first and second positions at the same time or sequentially to provide securement of cover assembly 205 at various locations (e.g., lock component 220L may be moved from its first to its second position simultaneously with, before, or after lock component 220R may be moved from its first to its second position). Alternatively, only one of lock components 220L and 220R may be moved from its first position to its second position for securing cover assembly 205. For example, in some embodiments, only one of lock components 220L and 220R may be provided by device 100. Alternatively, in some embodiments, more than two lock components 220 may be provided and moved for securing cover assembly 205.

A first lock component 220 of device 100 (e.g., lock component 220L) may be moved in a first direction from its first position to its second position while a second lock component 220 of device 100 (e.g., lock component 220R) may be moved in a second direction from its first position to its second position, where the second direction is different from the first direction. For example, although the direction of arrow KL for moving lock component 220L from its first position to its second position is shown to be parallel to the direction of arrow KR for moving lock component 220R from its first position to its second position (e.g., in the −Y-direction of FIG. 5), it is to be understood that lock component 220L may be configured differently than lock component 220R such that the direction of arrow KL may be orthogonal to or opposite to or otherwise different than that of arrow KR. Similarly, for example, although the direction of arrow UL for moving lock component 220L from its second position to its first position is shown to be parallel to the direction of arrow UR for moving lock component 220R from its second position to its first position (e.g., in the +Y-direction of FIG. 5), it is to be understood that lock component 220L may be configured differently than lock component 220R such that the direction of arrow UL may be orthogonal to or opposite to or otherwise different than that of arrow UR. For example, although not shown, rather than paths 230L and 230R extending parallel to one another, path 230L may extend along top wall 101T (e.g., orthogonally to path 230R along right wall 101R).

Figure 3:
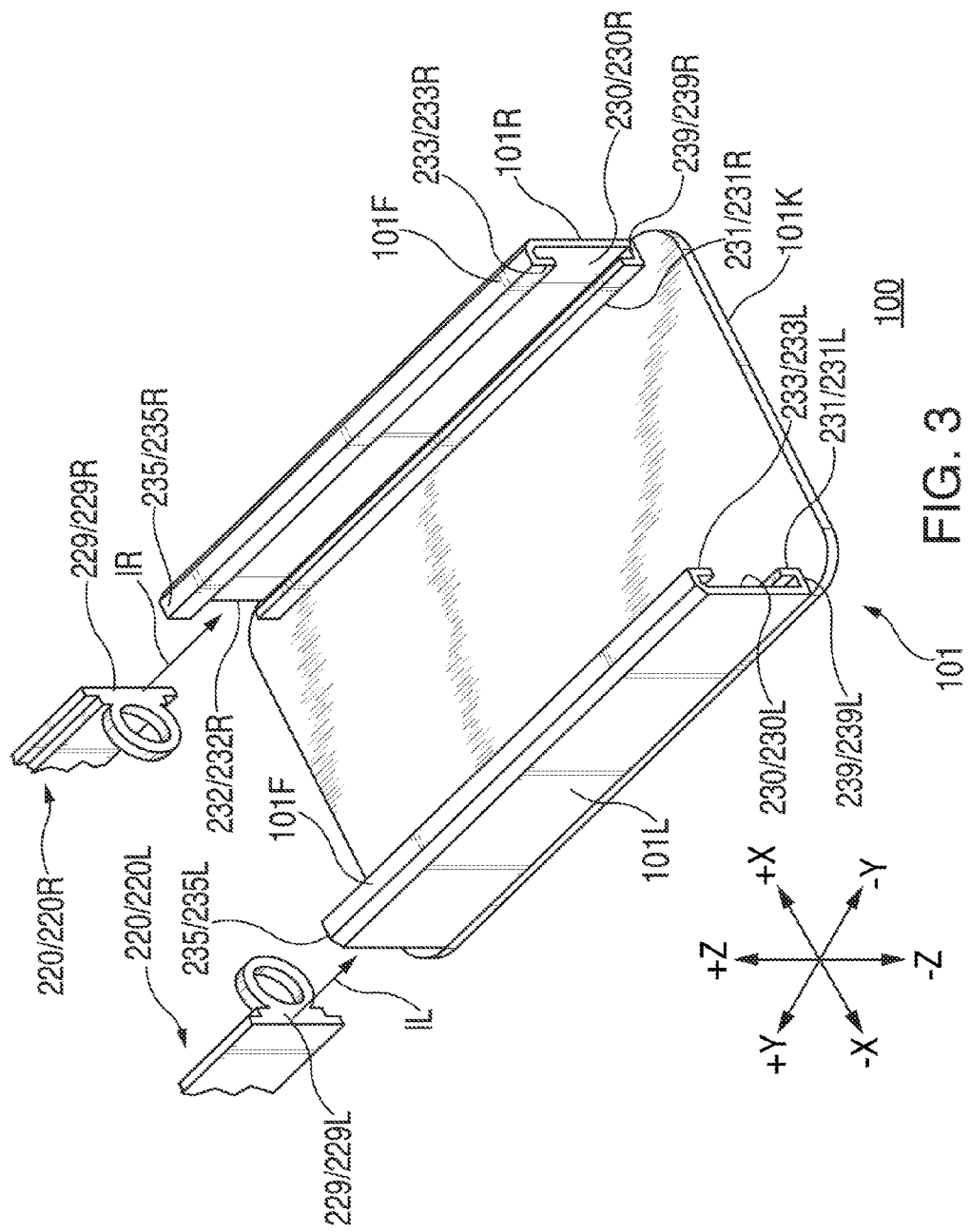
FIG. 3 is a front, bottom, left perspective view of the electronic device of FIGS. 1 and 2, in a first stage of assembly, in accordance with some embodiments of the invention.

In some embodiments, at least one end of a lock path 230 may be exposed for allowing insertion of a lock component 220 therein, and then that end of the lock path 230 may be closed by another component of device 100. For example, as shown in FIG. 3, a first path end 235 of lock path 230 may be accessible for inserting a lock component 220 therein. Specifically, as shown in FIG. 3, lock component 220L, which may be completely external to path 230L, may be inserted into path 230L by inserting lock end 229L of lock component 220L through accessible end 235L of path 230L in the direction of arrow IL to a position in which lock component 220L may be fully received by path 230L, as shown in FIG. 4. Similarly, as shown in FIG. 3, lock component 220R, which may be completely external to path 230R, may be inserted into path 230R by inserting lock end 229R of lock component 220R through accessible end 235R of path 230R in the direction of arrow IR to a position in which lock component 220R may be fully received by path 230R, as shown in FIG. 4. Then, once a lock component 220 is fully received by a path 230 through an accessible end (e.g., end 235) of the path 230, another component of device 100 may be coupled to that path end, which may prevent the removal of lock component 220 from path 230 via that path end. For example, as shown in FIG. 4, after lock component 220L has been fully received by path 230L via accessible path end 235L, a device component, such as top housing wall 101T, may be coupled to path end 235L (e.g., in the direction of arrow T), such that top housing wall 101T may prevent removal of lock component 220L from path 230L via path end 235L, as shown in FIG. 5 (e.g., in the direction of arrow UL). Similarly, as shown in FIG. 4, after lock component 220R has been fully received by path 230R via accessible path end 235R, a device component, such as top housing wall 101T, may be coupled to path end 235R (e.g., in the direction of arrow T), such that top housing wall 101T may prevent removal of lock component 220R from path 230R via path end 235R, as shown in FIG. 5 (e.g., in the direction of arrow UR). Moreover, in some embodiments, as shown in FIG. 4, another component of device 100, such as bottom housing wall 101B, may be coupled (e.g., in the direction of arrow B) to another path end (e.g., path end 239L and/or path end 239R) before, after, or concurrently with the closure of the counterpart path end (e.g., path end 235L and/or path end 235R), such that the removal of lock component 220 (e.g., lock component 220L and/or lock component 220R) from its path 230 may be prevented at both path ends.

Although each lock path 230 may be shown as "C-shaped" with a lower path hook 231 and an upper path hook 233 (e.g., for respectively retaining a lower lock edge 221 and an upper lock edge 223 of lock component 220 within lock path 230), each lock path 230 and each lock component 220 may include any other suitable set of geometries that may interact or otherwise engage with one another for defining a path along which a lock component 220 may travel from a first position to a second position for securing cover assembly 205. For example, in other embodiments, a lock path 230 may not include an upper path hook 233, yet lock component 220 may still be retained in an appropriate position with respect to lock path 230. For example, as shown in FIG. 2B, even if lock path 230L did not include upper path hook 233L, upper lock edge 223L of lock component 220L may still be retained in the same position of FIG. 2B due to a force that may be applied by frame 240 (e.g., by frame rail 242L) against another portion of lock component 220L (e.g., against lock extension 222L). In some other embodiments, for example, a lock path 230 may not include a lower path hook 231, yet lock component 220 may still be retained in an appropriate position with respect to lock path 230. For example, as shown in FIG. 2B, even if lock path 230R did not include lower path hook 231R, lower lock edge 221R of lock component 220R may still be retained in the same position of FIG. 2B due to a force that may be applied by frame 240 (e.g., by frame rail 242R) against another portion of lock component 220R (e.g., against lock extension 222R).

In yet some other embodiments, for example, a lock path 230 may not be specifically designed or provided by one or more components of device 100, as long as a lock component 220 is free to move from a first position within device 100 that allows cover assembly 205 to be deposited in its functional and/or fully assembled position within opening 209 of housing 101 without restricting movement of cover assembly 205 in at least a first direction, to a second position within device 100 that secures cover assembly 205 in its functional and/or fully assembled position within opening 209 of housing 101 by restricting movement of cover assembly 205 in at least the first direction (e.g., a +Z-direction, which may be opposite to the general direction in which cover assembly was initially deposited within opening 209). For example, rather than defining a path 230R that may receive and limit movement of lock component 220R, the internal surface of right housing wall 101R may instead be a substantially flat and featureless surface. In such embodiments, lock component 220R may initially be removably affixed (e.g., with a weak adhesive) to such an internal surface of right housing wall 101R, and then cover assembly 205 may be deposited within opening 209. Next, lock component 220R may be moved from its first position to its second position as described above (e.g., by a force from tool 138 and/or by device motion component 117), where such force may overcome the weak adhesive holding component 220R against wall 101R and may move lock component 220R for securing cover assembly 205.

Therefore, device 100 may be provided with a system that may provide a robust method for locking cover assembly 205 within opening 209. Once cover assembly 205 has been deposited in its functional and/or fully assembled position within opening 209 of housing 101 (e.g., by tilting cover assembly 205 with pivot 241 at notch 105), a screw or any other suitable device motion component 117 accessible external to housing 101 (e.g., at end 129 via device motion opening 107) may be manipulated to move (e.g., pull) a lock component 220 from a first position to a second position for locking cover assembly 205 in place. This may place most of the stress on lock component 220 and housing 101 rather than on the potentially fragile cover assembly 205. For example, once cover assembly 205 has been initially deposited (e.g., rested or gently tilted) in its functional and/or fully assembled position within opening 209 of housing 101, cover assembly 205 may not move in order to secure cover assembly 205 within opening 209. Instead, one or more lock components 220 and one or more device motion components 117 may be manipulated or otherwise moved or reconfigured for securing cover assembly 205. Rather than using stationary snaps within device 100 and stationary snaps on cover assembly 205 that may snap together when cover assembly 205 is initially deposited within opening 209 for securement therein, cover assembly may be gently rested on top of components of device 100 within opening 209 and may then be passively secured by the movement of a distinctly separate lock component 220. Such snaps may make it difficult to later remove cover assembly 205 from device 100 or may degrade over time as their connections are undone. However, movement of lock component 220 for engagement with stationary cover assembly 205 may be easily reversible and may not degrade with repeated use.

Figure 8:

FIG. 8 is a flowchart of an illustrative process 800 for securing a cover to an electronic device, where the electronic device may include a lock component within a housing having an opening. For example, process 800 may secure cover assembly 205 to electronic device 100 that may have a lock component 220 within housing 101 having opening 209. Step 802 of process 800 may include resting the cover in a first cover position on a portion of the electronic device within the opening (e.g., by depositing cover assembly 205 within opening 209 in its functional position of FIGS. 6 and 6A). Next, step 804 of process 800 may include, moving the lock component from a first lock position to a second lock position for securing the cover in the first cover position (e.g., by moving lock component 220 from the first position of FIGS. 6 and 6A to the second position of FIGS. 7 and 7A for securing cover assembly 205).

It is understood that the steps shown in process 800 of FIG. 8 are merely illustrative and that existing steps may be modified or omitted, additional steps may be added, and the order of certain steps may be altered.

FIG. 9 is a flowchart of an illustrative process 900 for assembling an electronic device (e.g., device 100). Step 902 of process 900 may include providing a first lock path using at least a first path component of the electronic device (e.g., lock path 230 using a wall of housing 101 of device 100). Step 904 may include inserting a first lock component into the first lock path at a first end of the first lock path (e.g., inserting lock component 220 into lock path 230 at end 235). Step 906 may include positioning a cover assembly adjacent the first path component (e.g., positioning cover assembly 205 within opening 205 adjacent path 230). Next, step 908 may include moving the first lock component along the first lock path from a first position to a second position, where the first lock component allows movement of the cover assembly in a first direction with respect to the first path component when the first lock component is in the first position, and where the first lock component prevents movement of the cover assembly in the first direction with respect to the first path component when the first lock component is in the second position (e.g., moving lock component 220 from the first position of FIGS. 6 and 6A to the second position of FIGS. 7 and 7A for securing cover assembly 205).

It is understood that the steps shown in process 900 of FIG. 9 are merely illustrative and that existing steps may be modified or omitted, additional steps may be added, and the order of certain steps may be altered.

While there have been described systems and methods for securing components of an electronic device, it is to be understood that many changes may be made therein without departing from the spirit and scope of the invention. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. It is also to be understood that various directional and orientational terms such as "up and "down," "front" and "back," "top" and "bottom" and "side," "length" and "width" and "thickness," "X-" and "Y-" and "Z-," and the like are used herein only for convenience, and that no fixed or absolute directional or orientational limitations are intended by the use of these words. For example, the devices of this invention can have any desired orientation. If reoriented, different directional or orientational terms may need to be used in their description, but that will not alter their fundamental nature as within the scope and spirit of this invention. Moreover, an electronic device constructed in accordance with the principles of the invention may be of any suitable three-dimensional shape, including, but not limited to, a sphere, cone, octahedron, or combination thereof, rather than a hexahedron, as illustrated by FIGS. 1-7A.

Therefore, those skilled in the art will appreciate that the invention can be practiced by other than the described embodiments, which are presented for purposes of illustration rather than of limitation.

What is claimed is:

1. An electronic device, comprising:
   a housing defining an opening;
   an electronic display cover disposed within the opening;
   a threaded screw; and
   a lock component defining a threaded opening engaged by the threaded screw, wherein rotation of the threaded screw causes the lock component to move within the housing from an unlocked position to a locked position in which the electronic display cover is secured within the opening, a direction of the movement of the lock component being aligned with an axis of rotation of the threaded screw.

2. The electronic device of claim 1, wherein the electronic display cover rests on a portion of the lock component.

3. The electronic device of claim 1, wherein the electronic display cover rests on a portion of the housing.

4. The electronic device of claim 1, wherein:
   the electronic display cover comprises a cover retention feature;
   the lock component comprises a lock retention feature; and
   the lock retention feature engages the cover retention feature when the lock component is in the locked position.

5. The electronic device of claim 1, wherein the housing defines a tool opening positioned and sized to receive a tool that exerts a force upon the lock component to translates the lock component from the locked position to the unlocked position.

6. The electronic device of claim 4, wherein:
   the electronic display cover retention feature comprises a hook; and
   the lock retention feature comprises a shape configured to move within the hook when the lock component is moved to the locked position.

7. The electronic device of claim 1, wherein:
   the electronic display cover is removable from the opening defined by the housing when the lock component is in the unlocked position; and
   the electronic display cover is prevented from being removed from the opening when the lock component is in the locked position.

8. The electronic device of claim 1, wherein the threaded screw extends through a wall of the housing to engage the threaded opening of the lock component.

9. The electronic device of claim 8, wherein the electronic display cover is prevented from lateral movement within the opening when the lock component is in the unlocked position.

10. The electronic device of claim 1, wherein the electronic display cover comprises a glass plate and a frame coupled to the glass plate.

11. An electronic device, comprising:
   a housing, comprising a plurality of housing walls that cooperate to define an interior volume and a front opening leading into the interior volume;
   a display assembly disposed within and filling the front opening;
   a threaded fastener extending through an exterior housing wall of the plurality of housing walls; and
   a lock component disposed within the interior volume, the lock component defining a threaded opening engaged by threads of the threaded fastener, wherein rotation of the threaded fastener moves the lock component in a direction aliened with an axis of rotation of the threaded fastener between an unlocked position in which the display assembly is removable from the housing and a locked position in which the display assembly is secured to the housing within the front opening.

12. The electronic device as recited in claim 11, wherein the housing defines a lip that supports a peripheral portion of the display assembly within the front opening.

13. The electronic device as recited in claim 11, wherein the display assembly is stationary during movement of the lock component.

14. The electronic device as recited in claim 11, wherein the display assembly comprises:
   a display component;
   a cover overlaying the display component; and
   a cover retention feature that engages the lock component when the lock component is in the locked position.

15. The electronic device as recited in claim 14, wherein the cover retention feature comprises a hook that extends from the cover and into the interior volume defined by the housing.

16. The electronic device as recited in claim 11, wherein a wall of the housing defines a channel within which the lock component moves between the locked and unlocked positions.

17. A portable electronic device, comprising:
   a device housing defining a channel and an opening;
   an electronic display cover disposed within the opening and cooperating with the device housing to define an interior volume, the cover comprising a cover retention feature extending into the interior volume;
   a device motion component extending through a wall of the device housing, the device motion component comprising an externally accessible head portion and a threaded portion;
   a lock component disposed within the channel, the lock component comprising:
      a lock retention feature, and
      a lock motion feature engaged with the device motion component,
   wherein rotation of the head portion of the device motion component causes the threaded portion to interact with the lock motion feature to translate the lock component in a direction aligned with an axis of rotation of the device motion component between an unlocked position and a locked position, and wherein in the locked position the lock retention feature of the lock component cooperates with the cover retention feature of the electronic display cover to secure the electronic display cover within the opening.

18. The portable electronic device as recited in claim 17, further comprising a first end cap at a first end of the channel and a second end cap at a second end of the channel.

19. The portable electronic device as recited in claim 7, wherein the device motion component comprises a screw.

20. The portable electronic device as recited in claim 17, wherein the cover retention feature comprises a hook.

* * * * *